C. A. PIPENHAGEN.
INSECT TRAP.
APPLICATION FILED JAN. 22, 1915.
1,217,343. Patented Feb. 27, 1917.
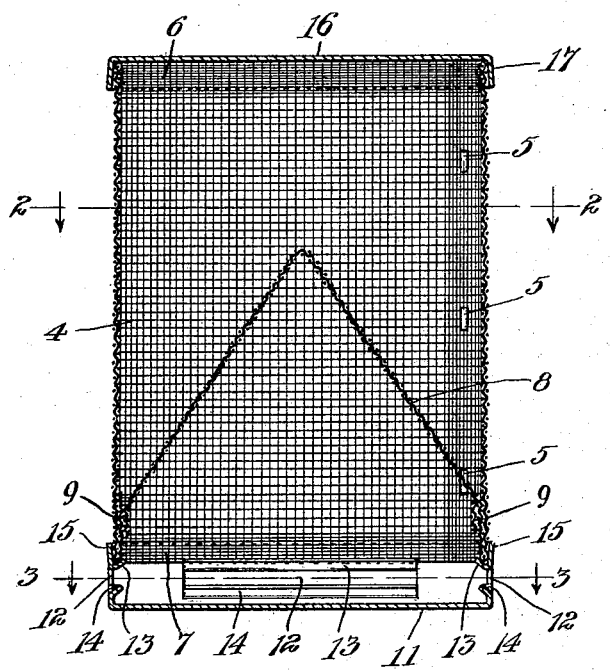
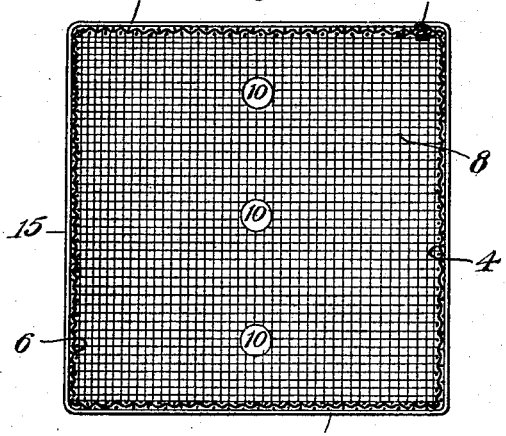
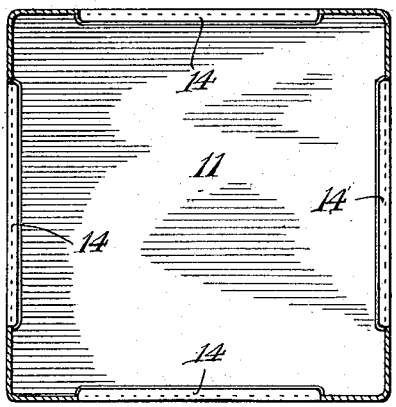
Witnesses:
F. J. Bull.
B. G. Richards
Inventor,
Charles A. Pipenhagen,
by Joshua R. H. Potts
his Attorney.

UNITED STATES PATENT OFFICE.

CHARLES A. PIPENHAGEN, OF CHICAGO, ILLINOIS.

INSECT-TRAP.

1,217,343.  Specification of Letters Patent.  Patented Feb. 27, 1917.

Application filed January 22, 1915. Serial No. 3,684.

*To all whom it may concern:*

Be it known that I, CHARLES A. PIPEN-HAGEN, a citizen of the United States, and a resident of the city of Chicago, county of Cook, and State of Illinois, have invented certain new and useful Improvements in Insect-Traps, of which the following is a specification.

My invention relates to improvements in insect traps, and has for its object the provision of an improved construction of this character especially adapted for catching flies, and which is efficient in use and capable of very economical manufacture.

The invention consists in the combinations and arrangements of parts hereinafter described and claimed.

The invention will be best understood by reference to the accompanying drawing forming a part of this specification, and in which, Figure 1 is a vertical section of a trap embodying my invention, Fig. 2, a section taken on line 2—2 of Fig. 1, and Fig. 3, a section taken on line 3—3 of Fig. 1.

The preferred form of construction, as illustrated in the drawing, comprises a tubular square body 4 formed of a sheet of wire cloth having its ends overlapped and secured together by means of staples 5. The top and bottom edges 6 and 7 are folded inwardly so as to reinforce these edges and present a comparatively smooth edge. The bottom of the body 4 is formed of a strip 8 of wire cloth of a width substantially equal to the width of the body 4 and bent into inverted V-form and having its ends 9 secured to the bottom portion of the sides of body 4 by staples or otherwise. Three entry openings 10 are formed in strip 8 at the apex thereof for the entry of the insects to the interior of the body 4.

A removable bait receiving base 11 in the form of a shallow sheet metal pan is arranged to receive the lower edges of the body 4. This base is provided in each of its sides with a horizontal elongated entry opening 12 formed by striking a flange 13 from the side and bending said flange inwardly and upwardly along its upper edge to constitute supports in the form of shallow channels for the lower edge of body 4. The approaches 14 to the openings 12 are also inwardly and upwardly inclined to facilitate the entry of insects to said base, and the upper portions 15 of the sides of pan 11 are flared outwardly slightly so as to facilitate the placing of the body 4 therein. A removable cover 16 in the form of a shallow sheet metal pan having slightly outwardly flaring sides 17 is fitted over the upper edges of the body 4, as indicated.

In use the bait is placed in the base 11 and the insects enter to feed upon the bait, and when satisfied tend to rise in the usual manner and enter the body 4 whence they may be removed when desired.

The form of construction disclosed is a simple and effective one for the purpose, and one capable of very economical manufacture.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. An insect trap comprising a bait receiving base in the form of a shallow sheet metal pan, there being entry openings formed in the sides of said pan by striking flanges therefrom and bending said flanges inwardly along their upper edges to constitute supports; and a body of foraminated material having means on the bottom thereof for the entry of insects thereto, said body being adapted to enter said pan and rest upon said supports, substantially as described.

2. An insect trap comprising a bait receiving base in the form of a shallow sheet metal pan, there being entry openings formed in the sides of said pan by striking flanges therefrom and bending said flanges inwardly along their upper edges to form shallow channels to constitute supports; and a body of foraminated material having means on the bottom thereof for the entry of insects thereto, said body being adapted to enter said pan and rest upon said supports, substantially as described.

3. An insect trap comprising a tubular body substantially square in cross section made of a sheet of wire cloth having its ends overlapped and secured together, the top and bottom edges of said body being folded inwardly to reinforce the same; a bottom for said body formed of a strip of wire cloth of a width substantially equal to the width of the body and bent centrally on a straight line into inverted V-form, the ends of said strip being secured to the bottom portions of the sides of said body, and there being entry openings formed in said strip at the apex thereof for the entry of insects; a removable bait-receiving base for said body in the form of a shallow sheet metal pan provided in each of said sides with a horizontal elongated entry opening formed by striking a flange therefrom and bending said flange inwardly and upwardly along its upper edge to constitute supports in the form of a shallow channel for the lower edge of said body, the approaches to the openings thus formed being inwardly and upwardly inclined to facilitate the entry of insects to said base; and a removable cover for said body in the form of a shallow sheet metal pan fitting over the upper edges thereof, substantially as described.

In testimony whereof I have signed my name to this specification in the presence of two subscribing witnesses.

CHARLES A. PIPENHAGEN.

Witnesses:
JOSHUA R. H. POTTS,
HELEN F. LILLIS.

Copies of this patent may be obtained for five cents each, by addressing the "Commissioner of Patents, Washington, D. C."